April 8, 1930.  E. H. MUELLER  1,753,833

VALVE AND METHOD OF MANUFACTURING SAME

Filed April 4, 1929

INVENTOR
Ervin H. Mueller

BY

ATTORNEYS

Patented Apr. 8, 1930

1,753,833

UNITED STATES PATENT OFFICE

ERVIN H. MUELLER, OF DETROIT, MICHIGAN

VALVE AND METHOD OF MANUFACTURING SAME

Application filed April 4, 1929. Serial No. 352,449.

This invention relates to a valve construction and the method of manufacturing the same, and an object of the invention is to provide a construction whereby the body of the valve may be formed in one piece with an integral outer end through which the operating stem extends, thus reducing the number of parts, simplifying the construction and assembly, and lessening the cost of manufacture. A further object is to provide a method of manufacture wherein a body is formed without a seat for the valve proper, the valve is then inserted in the body past that portion of the body to be formed with a seat, and the body then formed to provide such a seat, whereby said valve proper is enclosed against removal within a body formed in one piece. It is also an object to provide certain other new and useful features in the method of manufacture and construction, all as hereinafter more fully described.

With the above and other ends in view, the invention consists in the matters hereinafter set forth and more particularly pointed out in the appended claims, reference being had to the accompanying drawings, in which—

Figure 1:
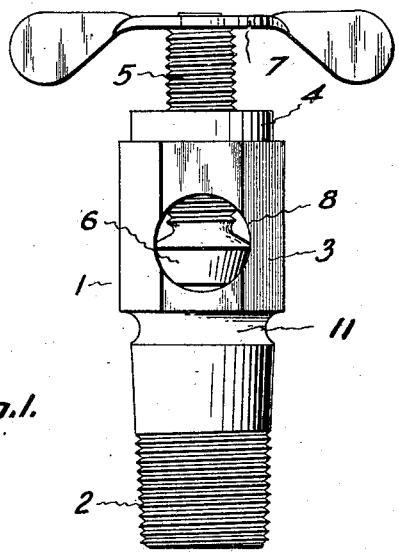
Figure 1 is a side elevation of a structure made in accordance with the present method, and illustrative of an embodiment of the invention.
Figure 2:
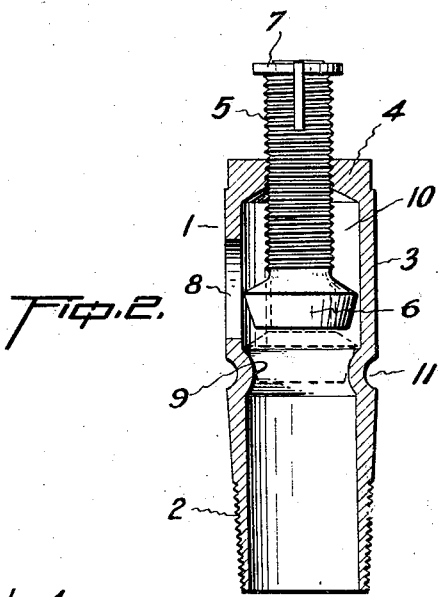
Fig. 2 is a longitudinal section through the body of the structure.
Figure 3:
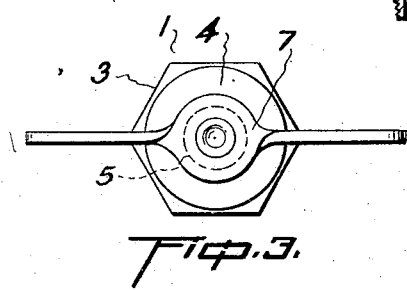
Fig. 3 is a plan view of Fig. 1.

Shut-off valves as commonly constructed, comprise a body formed with a valve seat surrounding the fluid passage leading through the body, with a suitable member for closing the open end of the body opposite the seat through which open end the valve proper is inserted to seat upon said seat, the operating stem of said valve extending through said closure and this removable closure being necessary in order that the valve may be inserted.

In the present method of manufacture, a body having an integral closed end with an opposite open end and devoid of any valve seat is provided, the valve inserted through the open end of the body, and the valve seat then formed on the body upon which the valve is adapted to seat and close the open end of the body, whereby said body may be formed in one piece and after the insertion of the valve therein, the seat for the valve then formed on the body, thus simplifying the construction and reducing the cost of manufacture.

In the drawing, 1 indicates the body of the device as a whole, said body being formed with the usual externally screw threaded nipple end portion 2 for screwing into an opening in any part to which the valve device is to be applied, said body being also exteriorly formed, preferably hexagonal in shape, as at 3, for the application of a wrench thereto for screwing the body into said opening and firmly connecting it to the part to which it is to be applied in use. This body is formed hollow or bored inwardly from the end 2 to near the opposite end, thus leaving the end wall 4 an integral part of the body, said wall being provided with an axial screw threaded opening to receive the operating stem 5 of the valve 6, which stem and valve are preferably formed integral, with the stem screw threaded throughout the major portion of its length for insertion in the screw threaded opening in the wall 4, by inserting the stem and valve through the open end of the nipple 2 and screwing the stem outwardly through said opening.

After the stem has been screwed into the opening in the wall 4 to project outwardly of the body therethrough, a handle 7 is secured in any suitable manner, to the outer end of the stem so that said stem may be readily turned, and to permit fluid to flow through the body, a side opening 8 is provided in one side of the body above a valve seat 9 formed on the body between the nipple end 2 thereof and said opening, the bore of the body beyond said seat providing a valve chamber 10 within which the valve proper is located.

In order that the valve 6 may seat upon said seat 9, it is necessary that said seat be of lesser diameter than the diameter of the valve, and therefore, in order to get the valve into the chamber 10, the seat is formed after the valve has been inserted, and to simplify the forming of the seat, the metal of the wall of the body is pressed inwardly, preferably by a spinning operation, forming an interior annular rib or seat 9 and an exterior annular groove 11. The valve and valve stem cannot, therefore, be removed from the body after the seat 9 has been formed.

With this method of manufacture and construction, the entire device comprises but three separate parts, and if the handle 7 be omitted and the stem turned by some other means, but two separate parts are required to make a complete operative shut-off valve, the body being one part and the valve and integral stem the other part, no detachable end closure being necessary in order that the valve may be inserted, as by the present method the valve is inserted past that part of the body to be formed after such insertion, with the seat for the valve.

Obviously changes in the construction of the device as shown, may be made within the scope of the appended claims, without departing from the method of manufacture or from the spirit of the invention, and I do not therefore limit myself to the particular arrangement shown.

Having thus fully described my invention, what I claim is:—

1. The method of manufacturing shut-off valves which consists in providing a body devoid of any valve seat, and providing a valve and valve stem, inserting the valve and valve stem through the open end of the body to be closed by the valve, and thereafter forming a seat on the body for said valve.

2. The method of manufacturing shut-off valves including a body, a valve and a valve stem, which method consists in providing a hollow body having a closed end and an open end to be closed by the valve, inserting the valve and valve stem into the body through the open end thereof, and after such insertion, forming a seat for the valve on the body between said valve and open end, by pressing an annular portion of the wall of the body inwardly.

3. The method of manufacturing shut-off valves including a body, a valve and a valve stem, which method consists in providing a hollow body having an integral end provided with an opening to receive the valve stem and an opposite open end, the passage through which is to be closed by the valve, then inserting the valve and valve stem into the body through the open end thereof with the valve stem extending outwardly through the opening in the integral end wall of the body and with the valve within the chamber of the body, and after such insertion forming an internal annular seat on the wall of the body between the open end thereof and the chamber in which the valve is located.

4. A valve comprising a hollow body open at one end and provided with an integral end wall at its opposite end, said wall being formed with a screw threaded opening, a valve, a screw threaded valve stem projecting outwardly through the screw threaded opening in the end wall, and a seat for the valve formed integral with the wall of the body between said valve and the open end of the body, said seat being formed after the insertion of said valve in said body, by distorting the metal of the body to form an interior annular rib.

5. A valve comprising a body formed with a bore extending inwardly from one end thereof to adjacent the opposite end to provide an integral end wall, said end wall having an axial screw threaded opening, the open end of the body being exteriorly screw threaded to provide a nipple and for the attachment of the body to a part to which it is to be applied, said body being also formed with a lateral opening affording communication with the inner end portion of the bore which forms a valve chamber, a valve having an integral and exteriorally screw threaded valve stem with said stem extending outwardly through the screw threaded opening in the integral end wall of the body, and a seat for said valve integral with the body between said lateral opening therein and the nipple end portion of the body, said seat being formed by pressing the metal of the wall of the body inwardly along an annular line to form an interior annular rib and an exterior annular groove.

In testimony whereof I affix my signature.

ERVIN H. MUELLER.